United States Patent
Lee et al.

(10) Patent No.: US 6,697,987 B2
(45) Date of Patent: Feb. 24, 2004

(54) METHOD OF PACKET DATA TRANSFER WITH HYBRID ARQ

(75) Inventors: Young Jo Lee, Kyonggi-do (KR); Ki Jun Kim, Seoul (KR); Chan Ho Kyung, Inchon (KR)

(73) Assignee: LG Electronics Inc., Seoul (KR)

( * ) Notice: Subject to any disclaimer, the term of this patent is extended or adjusted under 35 U.S.C. 154(b) by 388 days.

(21) Appl. No.: 09/899,945

(22) Filed: Jul. 9, 2001

(65) Prior Publication Data

US 2002/0053058 A1 May 2, 2002

(30) Foreign Application Priority Data

Oct. 31, 2000 (KR) ........................................ 2000-64304

(51) Int. Cl.[7] .............................................. H04L 1/20
(52) U.S. Cl. ...................................... 714/751; 714/774
(58) Field of Search ................................. 714/774, 751

(56) References Cited

U.S. PATENT DOCUMENTS

| | | | | |
|---|---|---|---|---|
| 5,946,320 A | * | 8/1999 | Decker | 370/428 |
| 5,954,839 A | * | 9/1999 | Park et al. | 714/699 |
| 6,126,310 A | * | 10/2000 | Osthoff et al. | 714/751 |
| 6,134,694 A | * | 10/2000 | Uebayashi et al. | 714/751 |
| 6,189,123 B1 | * | 2/2001 | Anders Nystrom et al. | 714/751 |
| 6,308,294 B1 | * | 10/2001 | Ghosh et al. | 714/751 |
| 6,317,418 B1 | * | 11/2001 | Raitola et al. | 370/278 |
| 6,353,907 B1 | * | 3/2002 | van Nobelen | 714/746 |
| 6,359,877 B1 | * | 3/2002 | Rathonyi et al. | 370/349 |
| 6,378,099 B1 | * | 4/2002 | Rowitch | 714/748 |

* cited by examiner

*Primary Examiner*—Stephen M. Baker
(74) *Attorney, Agent, or Firm*—Fleshner & Kim, LLP

(57) ABSTRACT

A method of transmitting packet data to a receiver in a communication system using a Hybrid ARQ technique is disclosed. In accordance with one illustrative embodiment of the present invention, an index representative of how much the first packet being transmitted such as a signal-to-noise (Eb/No) ratio is compared to a predetermined threshold value when an error is occurred during the step of decoding the packet. If the index is greater than or equal to the threshold value, the first packet transmitted is stored in a buffer and a receiver requests to transmit a second additional packet encoded with a lower code rate. On the other hand, if the index is less than the threshold value, the receiver requests to re-transmit the first packet encoded with the same code rate.

7 Claims, 2 Drawing Sheets

METHOD OF PACKET DATA TRANSFER WITH HYBRID ARQ

BACKGROUND OF THE INVENTION

1. Field of the Invention

The present invention relates to packet data transmissions, and more particularly, to a method for transmitting the packet data using a Hybrid ARQ (automatic repeat request) scheme in which packet re-transmission requests depend upon an index representative of how much the first packet data being transmitted is damaged.

2. Background of the Related Art

Generally, automatic repeat request (ARQ) and forward error correction (FEC) are well-known error control techniques commonly employed in many communication systems. In a communication system using ARQ, a receiving system makes requests to re-transmit data if the data were not received at all or were received erroneously. Therefore, an object of ARQ is to increase the reliability of the packet data transmission by re-transmitting the same data to the receiving system until the receiving system receives the data error-free. ARQ techniques provide very reliable communication, but they introduce undesirable delays, decreasing the data throughput rate of the system.

On the other hand, FEC techniques fix delay errors by using an error correction code. Therefore, an object of type 1 Hybrid ARQ schemes, in which both ARQ and FEC techniques are combined, is to have the delay error correction capability of FEC techniques and low error rates of basic ARQ scheme so that the reliability of the transmission and data throughput rates are enhanced.

In type 2 Hybrid ARQ schemes, a transmitter initially transmits a packet encoded with a given code rate. When a receiver requests to re-transmit the packet due to errors occurred, the transmitter transmits only redundant bits encoded with a lower code rate. Then the transmitted redundant bits are combined with the original data already stored in the receiver and are decoded.

FIG. 1 is a block diagram showing the structure of a ½ rate convolutional encoder used in a transmitter in Type 2 Hybrid ARQ according to the prior art. As it can be seen from FIG. 1, the encoder consists of a puncturing part and an encoding part having its code rate equal to ½. The transmitter decreases the code rate by changing its puncturing pattern so that the redundant bits can be decoded with the lower code rate.

According to the packet transmissions in a Type 2 Hybrid ARQ scheme using a Stop And Wait (SAW) method according to the prior art, initially, a transmitter transmits a packet to a receiver. Then the receiver checks whether its buffer is empty. The fact that buffer is empty or not will decide whether the transmitted packet is self-decodable. In other words, the transmitted packet is self-decodable if the buffer is empty and is not self-decodable if it is not empty. Therefore, the receiver decodes the packet if the buffer is empty. The following step is to check whether an error has occurred. If there was no error occurred, the receiver empties its buffer and requests to send a next packet. Otherwise, it stores the packet in the buffer and requests the transmitter to re-transmit the packet.

If the buffer located in the receiver is not empty, the re-transmitted packet, which is not self-decodable, is combined with the packet(s) already stored in the buffer and is decoded.

According to the Hybrid ARQ method used in the prior art, the data throughput rate of the system is decreased and the number of the transmission errors increases if the channel environment becomes worse. Additionally, when the initially transmitted packet is severely damaged by fading, it is very difficult to be decoded after combining with the re-transmitted redundant bits since they are not self-decodable.

SUMMARY OF THE INVENTION

Accordingly, the present invention is directed to a method for transmitting packet data using a Hybrid ARQ (automatic repeat request) scheme that substantially obviates one or more problems due to limitations and disadvantages of the related art.

An object of the present invention is to provide a method for transmitting packet data using a Hybrid ARQ scheme in which packet data re-transmission requests depend upon an index representative of how much the packet data being transmitted for the first time is damaged so that the reliability of the transmission can be greatly improved.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting packet data to a receiver in a communication system using a Hybrid ARQ technique includes transmitting a first packet encoded with a first code rate to a receiver, decoding the first packet in the receiver if a buffer used in the receiver is empty, comparing an index representative of how much the first packet is damaged to a predetermined threshold value if an error is occurred during the encoding process, storing the first packet in the buffer and requesting to transmit an additional packet encoded with a lower code rate if the index is greater or equal to the threshold value, requesting to re-transmit the first packet again if the index is less than the threshold value, and emptying the buffer and being ready for the next packet data transmission if no error occurred during the step of decoding the first packet.

The method further includes combining the first packet with an original packet already stored in the buffer and decoding the combined packet if the buffer is not empty, requesting to transmit the second additional packet encoded with the lower code rate if an error is occurred when the combined packet is decoded, and emptying the buffer and being ready for the next transmission if no error occurred during the step of combining and decoding.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

The current Hybrid ARQ schemes combine both Forward Error Correction (FEC) and Automatic Repeat Request (ARQ) techniques so that both of the reliability of data transmissions and data throughput rate in a communication system can be enhanced. An object of ARQ is to increase the reliability of the packet data transmissions by re-transmitting the same data to the receiving system until the receiving system receives the data error-free. On the other hand, FEC techniques fix delay errors occurred due to poor channel environments by using an error correction code.

In a system using Type 1 Hybrid ARQ, if an error occurs when decoding a transmitted packet, the same packet is re-transmitted again. Usually, the added FEC technique helps to increase the data throughput rate for systems having poor channel environments. However, when the channel environments are reasonably stable, the FEC technique combined with ARQ in Type 1 Hybrid ARQ rather has a negative effect on the data throughput rate of the system. This is the reason why Type 2 Hybrid ARQ has been introduced.

In type 2 Hybrid ARQ schemes, a transmitter initially transmits data encoded with the highest code rate. When a receiver requests to re-transmit the data due to errors occurred, the transmitter transmits only redundant bits encoded with a lower code rate. Then the redundant bits are added to the original data and decoded in the receiver.

Figure 1:
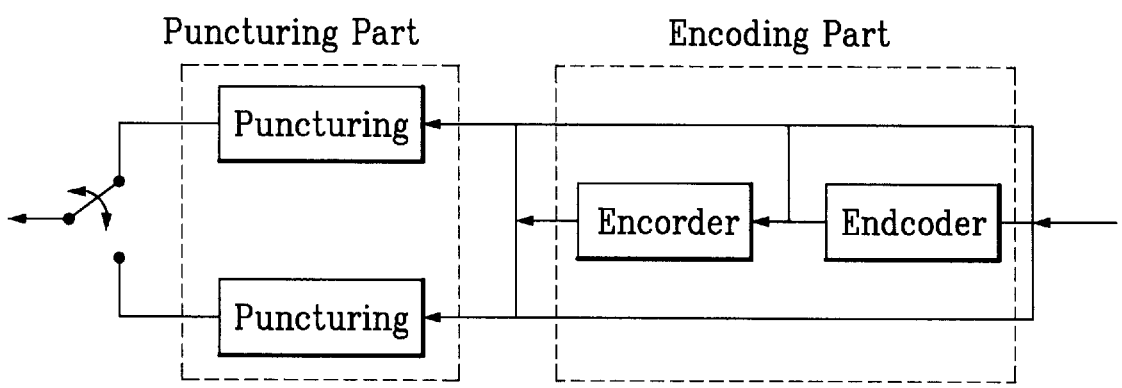
FIG. 1 illustrates the structure of a ½ rate convolutional encoder used in a transmitter using Type 2 Hybrid ARQ according to the prior art.
Figure 2:
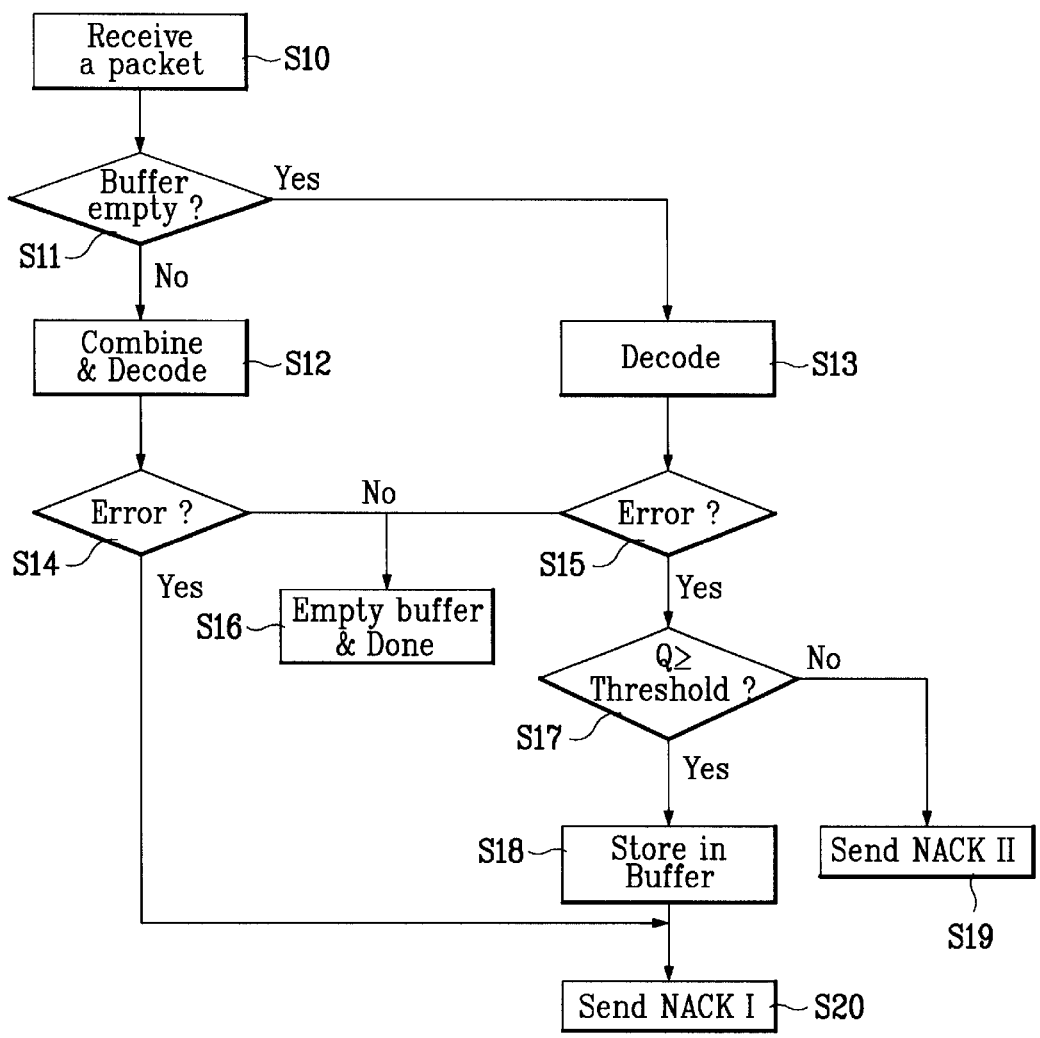
FIG. 2 is a flow chart illustrating steps for transmitting a packet to a receiver in a communication system using a Type 2 Hybrid ARQ scheme according to the present invention.

FIG. 2 is a flow chart illustrating steps for transmitting packets to a receiver in a communication system using a Type 2 Hybrid ARQ scheme according to the present invention. First, a receiver receives a packet from a transmitter (S10). The first packet that gets transmitted to the receiver is punctured by a puncturing pattern, a (1)=[1 1 1 0, 1 0 0 1] with a code rate of ⅘. When the receiver makes requests to re-transmit, the transmitter decreases its code rate to 4/6, 4/7, 4/8, and so on and sends the code in which only redundant bits are added. In other words, each packet being re-transmitted for the first, second, and third time is punctured in the transmitter by puncturing patterns, a (2)=[1 1 1 0, 1 1 0 1], a (3)=[1 1 1 1, 1 1 0 1], and a (4)=[1 1 1 1, 1 1 1 1], respectively.

Returning to FIG. 2 again, the first packet that gets transmitted to the receiver is self-decodable and has its puncturing pattern of a (1). Next, the receiver checks whether its buffer is empty (S11). If it is, the receiver decodes the received packet since the packet is self-decodable (S13). Then it checks whether an error has occurred in the step S14 (S15). If there was no error, the receiver empties the buffer and terminates the transmission (S16). However, if there was any error occurred, an index representative of how much the packet is damaged (i.e., the Signal-to-Noise power ratio (Eb/No)) is compared with a predetermined threshold value (S17). If the ratio is greater or equal to the threshold value, the receiver stores the packet in the buffer (S18) and sends NACK 1 to the transmitter requesting to transmit another packet encoded with a lower code rate (S20). This packet is punctured with a second puncturing pattern, a (2) and is not self-decodable. If the ratio is less than the threshold value, it sends NACK 2 requesting to re-transmit the same packet punctured with a (1) which is self-decodable.

If the buffer is not empty in the step S11, the receiver combines the additionally transmitted packet, which is not self-decodable, with the original packet already stored in the buffer and decodes the combined packet (S12). Then it checks if there is an error is the step S12 (S14). If there is, it requests to transmit the packet having the next puncturing pattern (S20). Otherwise, it empties the buffer and terminates the transmission (S16).

As it is mentioned earlier, the system, in which a present invention is used, can increase the reliability of packet transmissions specially when the originally transmitted packet is damaged.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of transmitting packet data to a receiver in a communication system using a Hybrid ARQ technique, the method comprising the steps of:
   (a) transmitting a first packet encoded with a first code rate to a receiver;
   (b) decoding said first packet in said receiver if a buffer used in said receiver is empty;
   (c) comparing an index representative of how much said first packet is damaged to a predetermined threshold value if a first error is occurred during the step (b);
   (d) storing said first packet in said buffer and requesting to transmit a second additional packet encoded with a second code rate if said index is greater than or equal to said threshold value, said second code rate being lower than said first code rate; and
   (e) requesting to re-transmit said first packet if said index is less than said threshold value.

2. The method of claim 1, further comprising the steps of emptying said buffer and being ready for the next packet transmission if no error is occurred during the step (b).

3. The method of claim 1, wherein said first packet is self-decodable if said buffer is empty and is not self-decodable if said buffer is not empty.

4. The method of claim 1, wherein said second packet includes an error correction code.

5. The method of claim 1, wherein said index is a signal-to-noise (Eb/No) ratio of said first packet.

6. The method of claim 1, further comprising the steps of:
   (f) combining said first packet with an original packet already stored in said buffer and decoding said combined packet if said buffer is not empty; and
   (g) requesting to transmit said second additional packet encoded with said second code rate if a second error is occurred in the step (f).

7. The method of claim 6, further comprising the step of emptying said buffer and being ready for the next packet transmission if no error is occurred during the step (f).

* * * * *